United States Patent
Jung et al.

[11] Patent Number: 6,097,949
[45] Date of Patent: Aug. 1, 2000

[54] METHOD FOR PROVIDING CLOSED USER GROUP SERVICE IN MOBILE COMMUNICATION NETWORK

[75] Inventors: Hae Kwan Jung; Seul Gi Lim; Han Sik Jang; Jae Sung Lim, all of Seoul, Rep. of Korea

[73] Assignee: SK Telecom Co., Ltd., Seoul, Rep. of Korea

[21] Appl. No.: 09/060,392

[22] Filed: Apr. 14, 1998

[30] Foreign Application Priority Data

Apr. 15, 1997 [KR] Rep. of Korea ............. 97-13854

[51] Int. Cl.$^7$ ........................ H04Q 7/20
[52] U.S. Cl. ............... 455/426; 455/466
[58] Field of Search .................. 455/426, 414, 455/422, 466, 31.3

[56] References Cited

U.S. PATENT DOCUMENTS

| | | | |
|---|---|---|---|
| 5,692,032 | 11/1997 | Seppanen et al. | 455/466 |
| 5,878,351 | 3/1999 | Alanara et al. | 455/31.3 |
| 5,930,239 | 7/1999 | Turcotte | 455/466 |
| 5,953,400 | 9/1999 | Rosenthal et al. | 455/416 |

*Primary Examiner*—Daniel S. Hunter
*Assistant Examiner*—Myron K. Wyche
*Attorney, Agent, or Firm*—Sheridan Ross P.C.

[57] ABSTRACT

A method for providing a closed user group service in mobile communication network. The mobile stations belonging to a certain CUG group must save the correspondence message identifier(ID) before start of service. For assigning or cancelling a message identifier to a mobile station, teleservice identifier(TI) message in a point-to-point short message is used. The mobile stations receive the cell broadcast message and compares the message ID of the received message with the saved message ID in their storage device. If the message ID of the received message is equal to the saved message ID, the mobile stations belonging to the certain group display the message information on their own display panel. If not, the mobile stations do not display.

4 Claims, 3 Drawing Sheets

MESSAGE TRANSMITTED TO TERMINALS BELONGING TO CUG GROUP A

MESSAGE TRANSMITTED TO TERMINALS BELONGING TO CUG GROUP B

•
•
•
•

MESSAGE TRANSMITTED TO TERMINALS BELONGING TO CUG GROUP N

METHOD FOR PROVIDING CLOSED USER GROUP SERVICE IN MOBILE COMMUNICATION NETWORK

BACKGROUND OF THE INVENTION

1. Technical Field of the Invention

The present invention relates to a mobile communication service, and more particularly to a method for providing a closed user group service capable of transmitting a particular message to mobile stations(terminals) belonging to a certain group in a mobile communication network.

2. Description of the Prior Art

FIG. 1 shows a block diagram illustrating a mobile communication network employed in the general cell broadcast service.

The reference numeral 101 denotes a cell broadcast center/short message center(CBC/SMC), 102 an information provider(IP), 103 a mobile communication network such as a cellular or personal communication service(PCS) network, 104 a mobile telephone, and 105 an exclusive terminal for cell broadcast such as a notebook computer (a lap top computer) or a palm top computer.

The CBC/SMC 101 receives cell broadcast messages from the information provider 102, performs cell broadcast scheduling and processes for respectively writing special message identifiers to storage devices of the mobile stations 104 and 105 using teleservice identifiers(TI), selects a base station controller/base station transceiver system(BSC/BTS) to which the messages are transmitted and then decides interface between the CBC/SMC 101 and the mobile communication network 103.

The information provider 102, which is one of a plurality of information sources, provides information to be cell broadcasted.

The mobile communication network 103 performs processes for transmitting the cell broadcast messages from the CBC/SMC 101 to each of terminals in the cell.

It should be possible for the mobile stations 104 and 105 to receive the cell broadcast messages and to display the receipt of the messages. The mobile station 104 may be an audio terminal with display function of the received message such as a mobile telephone. The mobile station 105 may be an exclusive terminal such as a notebook computer and a palm top computer. Each of mobile stations 104 and 105 compares the message identifier of the received messages with that saved on its own internal storage device. Then, the mobile stations 104 and 105 display the received messages, if the message identifier of the received messages is equal to the message identifier saved on its own internal storage device.

The cell broadcast service is an one-way service in which the CBC/SMC transmits particular messages to all the mobile terminals within a selected area(which is referred to as 'cell'). In other words, the CBC/SMC receives various kinds of information from the information providers 102 and transmits the information to a plurality of users such as a mobile telephone 104 or an exclusive terminal 105. The plurality of the users can be simultaneously receive the information. The information may include a weather forecasting, information about stock exchange, information about sports, traffic information, discharge rate of charge, and etc.

The closed user group service(CUG) is a service which provides only users belonging to a particular group with special cell broadcast messages.

Let's assume that there are three groups A, B and C in the same cell, and that the CBC/SMC wants to make the users belonging to the group "A" come back to their office. In the prior cell broadcast service, if the CBC/SMC transmits the message "Please quickly return to the office.", all of users in the cell receive the message. The users belonging to the groups B and C are confused of the message. On the other hands, if the CBC/SMC transmits message "Men and women belonging to the group A, please quickly return to the office.", the users belonging to the groups B and C receive the unnecessary message even if there is no confusion.

Therefore, there is a need for a method for making only users belonging to a particular group receive a certain message in spite of using the prior cell broadcast service network.

SUMMARY OF THE INVENTION

Therefore, an object of the present invention is to provide a method for providing a closed user group service in which only users belonging to a particular group of many groups in the same cell can receive a certain message.

According to the preferred embodiment of the present invention, this object is accomplished by providing a method for providing a closed user group service in mobile communication network which comprises a least of mobile station, and a cell broadcast center/short message center, the method including the steps of: a) respectively assigning a certain message identifier to the mobile stations belong to a closed user group; b) storing the certain message identifier onto a storage means within the mobile station; c) comparing the message identifier in the received cell broadcast message with the stored message identifier on the storage means after receiving the broadcast message; and d) displaying the received cell broadcast message on panel of the mobile station, if the message identifier in said received cell broadcast message is equal to the stored message identifier.

BRIEF DESCRIPTION OF THE DRAWINGS

Other objects and aspects of the invention will become apparent from the following description of the embodiments with reference to the accompanying drawings in which.

DETAILED DESCRIPTION OF THE PREFERRED EMBODIMENTS

The embodiments of the present invention will be described with reference to FIG. 2 through 5.

Figure 1:
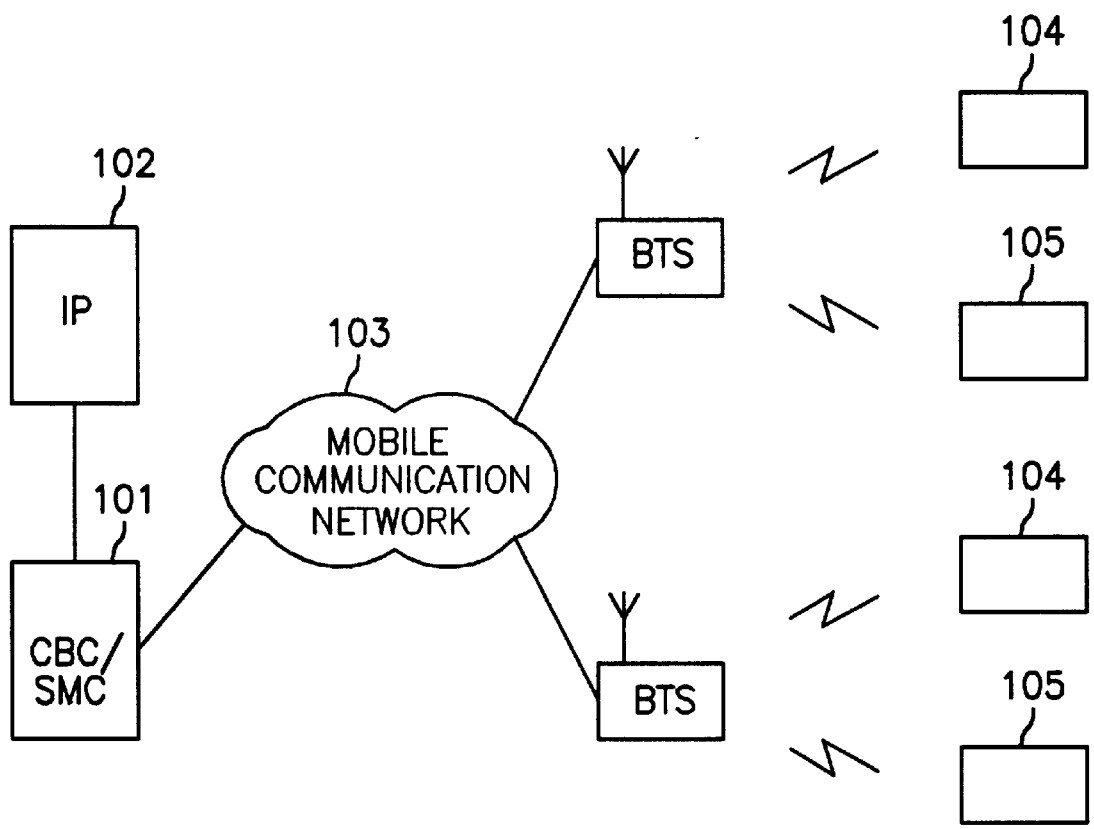
FIG. 1 is a block diagram illustrating a mobile communication network employed in the general cell broadcast service.
Figure 2:
FIG. 2 is a block diagram illustrating data structure of cell broadcast message in accordance with the present invention.

FIG. 2 shows a block diagram illustrating a data structure of cell broadcast message in accordance with the present invention.

The cell broadcast message includes a message identifier (ID) 201 and a message information 202. Each of the cell broadcast messages has a message ID in their header.

Figure 3:
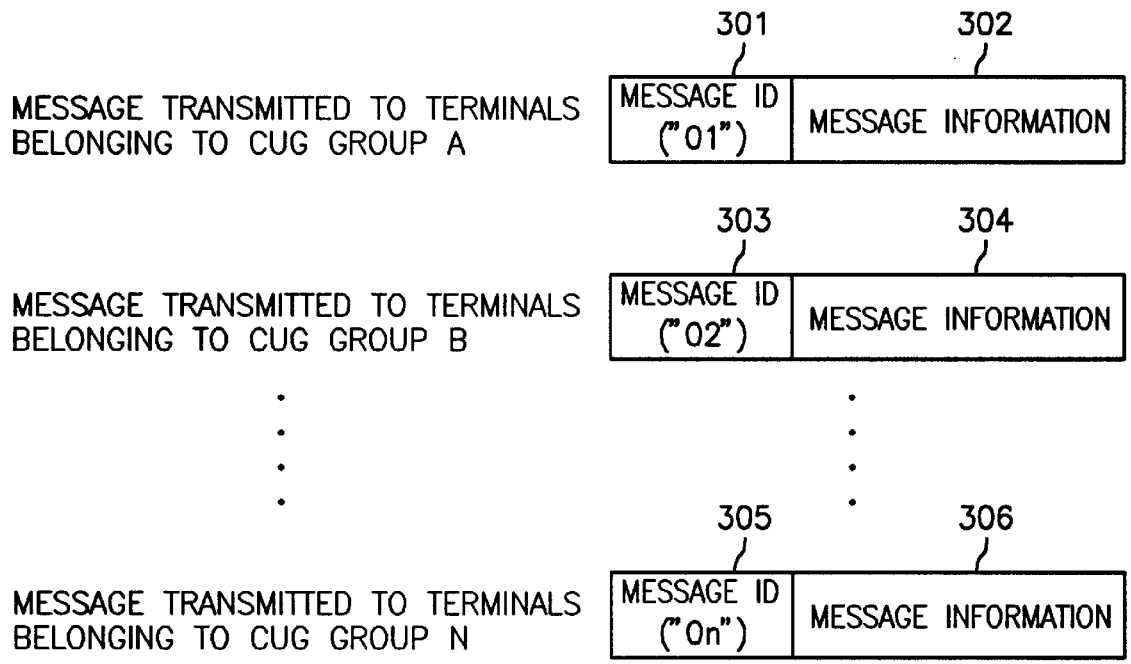
FIG. 3 is a block diagram illustrating data structure used for implementing the closed user group service in accordance with the present invention.

FIG. 3 shows a block diagram illustrating a data structure of cell broadcast messages used for implementing the closed user group service in accordance with the present invention.

In the present invention, unique message IDs 301, 303 and 305 is respectively assigned to each of the closed user groups. Each of the cell broadcast messages has the unique message ID. When the cell broadcast message is transmitted to a certain group, the message to be transmitted includes the message ID corresponding to the certain group. For example, the message ID 301 "01" is assigned to the CUG group "A", the message 303 "02" to the CUG group "B" and the message 305 "On" to the CUG group "N".

For receiving the cell broadcast message, each of the mobile stations respectively saves the assigned message ID on the embedded storage device such as a subscriber identifier module or EEPROM. If the message ID is equal to that of the received cell broadcast message when the mobile station receives the cell broadcast message, the mobile station displays the message on its display panel. If not, the mobile station does not display.

For assigning or cancelling a message identifier to a mobile station, teleservice identifier(TI) message in a point-to-point short message is used. Details of assigning or cancelling method will be described below with reference to FIG. 4.

For example, the mobile station belonging to the CUG group "A" saves message ID "01" onto the embedded storage device, the mobile station belonging to the CUG group "B" does message ID "02". When the CBC/SMC wants to make the users belonging to the group "A" come back to their office, the CBC/SMC sets the message ID as "01", transmits the message including the message ID "01" and the message information 302 "Please quickly return to the office.".

The mobile stations belonging to the CUG group "A" receive the message and compares the message ID of the received message with the saved message ID in their storage device. Since the message ID of the received message is equal to the saved message ID, the mobile stations belonging to the CUG group "A" display the message information on their own display panel.

However, since the message ID of the received message is not equal to the saved message ID in their storage device, the mobile stations belonging to the other CUG groups such as the group "B" do not display.

For the closed user group service, all of mobile stations have to respectively save message IDs before start of the service. When a user wants to making a application or a cancellation of the closed user service, the message ID identifying the group has to be saved onto or erased from the embedded storage device of the user's terminal.

The message ID of the cell broadcast message must not be saved, changed or cancelled by means of the users. In other words, It should be possible for only the CBC/SMC to control save, change and cancellation of the message ID of the users' terminal.

Figure 4:
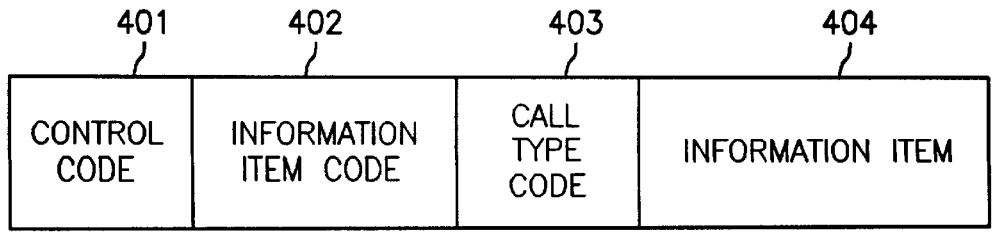
FIG. 4 is a block diagram illustrating data structure of control data for controlling mobile stations.

FIG. 4 shows a block diagram illustrating a data structure of control data for controlling mobile stations. The reference numeral 401 denotes a control code, 402 an information item code, 403 a call type code and 404 an information item.

The control data is not for all terminals, for a certain mobile station of which a subscriber wants to receive a particular messages. Therefore, the control data should be transmitted not as cell broadcast message but short message using point-to-point way.

Also, the terminal can discriminate the control data from the cell broadcast data. The control data is for controlling the terminal not for being displayed, the cell broadcast data is to be displayed on the panel of the terminal. The discrimination can be implemented by IS637 Standard Teleservice Identifier(TI).

TI values defined at IS637 are only 4096(AMPS Extended Protocol Enhanced Service), 4097 (CDMA Cellular Paging Teleservice), 4098(CDMA Cellular Message Teleservice), 4099(CDMA Voice Mail Notification) and 4100(over/the/air service provisioning). Some TI values are only reserved (not defined). Therefore, the discrimination in which the received message is a control data or a cell broadcast data, can be implemented by using one of the reserved TI values.

The control code 401 represents whether the received message is for registration or cancellation of the message ID. The information item code 402 represents what kind of message is to be transmitted to the user as a certain (reserved) code. The call type code 403 represents whether the received message is a new or an updated message. The information item 404 represents what kind of message is to be transmitted to the user, for example, weather forecasting information, a news flash, stock exchange information, and etc.

For example, in the cell broadcast service, a subscriber wants to receive "news flashes" of which the message ID is "01". The CBC/SMC should transmit the correspondence control data to the subscriber. The control code 401 is set as '0x00' (which is assumed to mean registration of the message in this case), the information item code 402 is set as '01', the call type code 403 is set '0x01' (which is assumed to mean that the message is updated data) and the information item 404 is set as 'news flashes'. After receiving and saving the above described control data, it is possible for the mobile station to receive reports of news flash. If the subscriber wants to cancel the receipt of news flash, the CBC/SMC transmits the message in which the control code 401 is set as '0x99' (which is assumed to mean cancellation of the message in this case) and the other codes are the same as the above described. Then it is not possible for the mobile station to receive 'news flashes' any more, because it has no the message ID for receiving news flashes.

Figure 5:
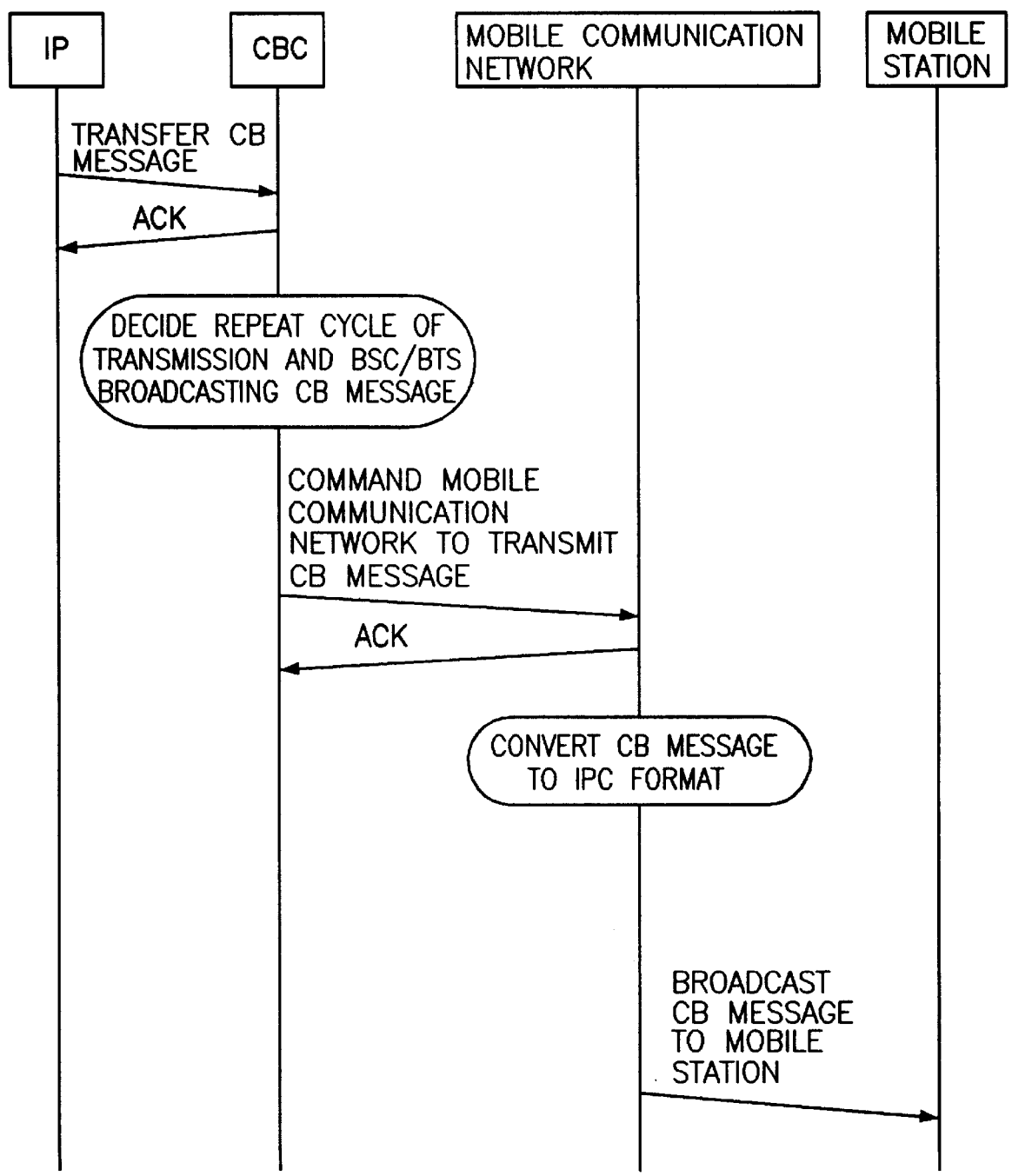
FIG. 5 is a flowchart illustrating broadcasting messages in the closed user group service in accordance with the present invention.

FIG. 5 shows a flowchart illustrating broadcasting messages in the closed user group service in accordance with the present invention.

The CBC/SMC 101 receives cell broadcast messages from the information provider 102 and transmits the acknowledgment of receipt to the information provider 102. The CBC/SMC 101 decides a repeat period of transmission of the message, selects BSC/BTS in the mobile communication network transmitting the message to mobile stations, and command the mobile communication network to transmit the cell broadcast message. The mobile communication network receives the transmitting command from the CBC/SMC 101, acknowledges receipt of the command, converts the cell broadcast message into inter-process communication (IPC) form message and broadcasts the received cell broadcast message through paging channel to the mobile stations 104 and 105.

Although the preferred embodiments of the invention have been disclosed for illustrative purposes, those skilled in the art will appreciate that various modifications, additions and substitutions are possible without departing from the scope and spirit of the invention as disclosed in the accompanying claims.

What is claimed is:

1. A method for providing a closed user group service in a mobile communication network which comprises at least a first mobile station, and a cell broadcast center/short message center, said method including the steps of:

(a) respectively assigning a first closed user group (CUG) identifier to each mobile station belonging to a first closed user group having at least a first mobile station;

(b) storing said first CUG identifier in a storage means within said at least a first mobile station;

(c) comparing a received CUG identifier in a received cell broadcast message with said stored first CUG identifier after receiving said broadcast message at said at least a first mobile station; and (d) displaying said received cell broadcast message on a panel of said at least a first mobile station, if said received CUG identifier is equal to said stored first CUG identifier.

2. A method as claimed in claim 1, further including the step of:

(e) cancelling said first CUG identifier from said storage means within said at least a first mobile station, when a subscriber belonging to said closed user group does not want to be provided said service any more.

3. A method as claimed in claim 1, wherein in said step a) respectively assigning, a teleservice identifier (TI) message in a point-to-point short message is used to assign said CUG identifier.

4. A method as claimed in claim 2, wherein in said step e) cancelling, a teleservice identifier (TI) message in a point-to-point short message is used to cancel said first CUG identifier from said storage means.

* * * * *